US009972072B2

(12) United States Patent
Monden

(10) Patent No.: US 9,972,072 B2
(45) Date of Patent: May 15, 2018

(54) NOISE REDUCTION APPARATUS, METHOD AND PROGRAM FOR THE SAME

(71) Applicant: NEC Corporation, Minato-ku, Tokyo (JP)

(72) Inventor: Akira Monden, Tokyo (JP)

(73) Assignee: NEC CORPORATION, Tokyo (JP)

( * ) Notice: Subject to any disclaimer, the term of this patent is extended or adjusted under 35 U.S.C. 154(b) by 62 days.

(21) Appl. No.: 14/912,992

(22) PCT Filed: Aug. 20, 2014

(86) PCT No.: PCT/JP2014/004265
§ 371 (c)(1),
(2) Date: Feb. 19, 2016

(87) PCT Pub. No.: WO2015/037189
PCT Pub. Date: Mar. 19, 2015

(65) Prior Publication Data
US 2016/0210729 A1 Jul. 21, 2016

(30) Foreign Application Priority Data

Sep. 12, 2013 (JP) .................................. 2013-189549

(51) Int. Cl.
*H04N 1/409* (2006.01)
*G06T 5/00* (2006.01)
*H04N 5/357* (2011.01)

(52) U.S. Cl.
CPC ............. *G06T 5/002* (2013.01); *H04N 1/409* (2013.01); *H04N 5/357* (2013.01); *G06T 2207/10036* (2013.01); *G06T 2207/20016* (2013.01)

(58) Field of Classification Search
CPC .................................. H04N 5/262; G06K 9/36
(Continued)

(56) References Cited

U.S. PATENT DOCUMENTS

| 2004/0141659 A1 | 7/2004 | Zhang | |
| 2009/0161992 A1* | 6/2009 | Taguchi | G06T 3/4007 382/299 |

FOREIGN PATENT DOCUMENTS

| JP | H07-319092 A | 12/1995 |
| WO | 2007/116543 A1 | 10/2007 |

OTHER PUBLICATIONS

International Search Report for PCT Application No. PCT/JP2014/004265, dated Oct. 28, 2014.
(Continued)

*Primary Examiner* — Joel Fosselman

(57) ABSTRACT

In order to reduce the possibility of damaging a signal component of the original image during the noise reduction of an image created by pan-sharpen processing or the like based on a plurality of images of the same image object, which are taken simultaneously with different resolutions, a noise reduction apparatus according to the present invention includes a multiresolution decomposition means that performs multiresolution decomposition on a first image inputted to obtain components having a prescribed first resolution, the first image having a prescribed resolution, the prescribed first resolution being lower than the prescribed resolution of a second image inputted, the second image being captured simultaneously with the first image, the first image and the second image being images of a same object, a low resolution component compensation means that compensates at least one decomposition component created by the decomposition with use of the second image, and an image reconfiguration means that replaces the component decomposed with a decomposition component created by the compensation, reconfigures the first image, and outputs the first image thus reconfigured.

5 Claims, 9 Drawing Sheets

(58) Field of Classification Search
USPC .................. 348/231.99, 164; 382/168, 284
See application file for complete search history.

(56) References Cited

OTHER PUBLICATIONS

English translation of Written opinion for PCT Application No. PCT/JP2014/004265.

* cited by examiner

NOISE REDUCTION APPARATUS, METHOD AND PROGRAM FOR THE SAME

This application is a National Stage Entry of PCT/JP2014/004265 filed on Aug. 20, 2014, which claims priority from Japanese Patent Application 2013-189549 filed on Sep. 12, 2013, the contents of all of which are incorporated herein by reference, in their entirety.

TECHNICAL FIELD

The present invention relates to a noise reduction apparatus, a method and a program for the same.

BACKGROUND ART

Historically, systems for photographing the ground or the like from satellites or aircrafts have been used. In such systems, a single image object is often photographed by performing simultaneous capturing of a panchromatic image with high resolution and a multispectral image with a resolution lower than that of the panchromatic image. A panchromatic sensor is configured to capture an image in all wavelengths of visible and near-infrared light, and a multispectral sensor is configured to capture an image only in particular wavelengths such as blue light or red light. The multispectral sensor is capable of capturing an image of a particular color. However, the amount of light per unit area received by the multispectral sensor is smaller as compared with the panchromatic sensor. As the amount of light per pixel received by the sensor decreases, noise components increase relative to the signal components. This makes it difficult to capture images of good quality. In order to avoid such things, in the multispectral sensor, the amount of received light is increased by lowering the resolution and enlarging the image area per pixel as compared with that of the panchromatic sensor. In such a system simultaneously capturing both a low resolution multispectral image and a high resolution panchromatic image, pan-sharpen processing is performed to create a high resolution color image by combining these two images In the pan-sharpening processing, a high resolution color image is created, for example, by decomposing components of each pixel of a multispectral image into a brightness component, a hue component and a chroma component, and replacing the brightness component with a component of a panchromatic image with high resolution. Incidentally, to reduce noise included in an image is a general issue and not limited to a high resolution color image created by the pan-sharpen processing. Such noise reduction is performed by image processing. Patent Literature 1 describes a method related to noise reduction by image processing.

The method described in Patent Literature 1 is as follows.

The image processing method for reducing noise included in an image includes an image input procedure of inputting an original image comprising a plurality of pixels. The method further includes a multiresolution image creation procedure of decomposing the inputted original image and creating a plurality of low frequency images having sequentially lower resolutions and a plurality of high frequency images having sequentially lower resolutions, and a noise reduction processing procedure of performing noise reduction processing on each one of the low frequency images and the high frequency images. The method further includes an image acquiring procedure of acquiring an image in which noise is removed from the original image on the basis of results of the low frequency images with noise reduced and the high frequency images with noise reduced.

CITATION LIST

Patent Literature

[PTL 1] WO/2007/116543

SUMMARY OF INVENTION

Technical Problem

In the method described in PTL 1, there is a concern that signals of the original image may be impaired because noise reduction is performed over a single image. In general noise reduction methods including the method described in PTL 1, the characteristics of noise are assumed in advance and noise components are estimated on the basis of the characteristics of noise to reduce the noise. In that process, signal components of the original image may be determined as noise and thus reduced. There is a concern that original signal components may also be impaired in an image created by the pan-sharpen processing based on a panchromatic image and a multispectral image that have been subjected to such noise reduction.

As described above, in the method described in PTL 1, there is a problem that, because of the nature of the noise reduction method, signal components of the original image are impaired during noise reduction in an image created by the pan-sharpen processing or the like based on a plurality of images having resolutions different from each other and being captured simultaneously with respect to the same image object.

The present invention is made to resolve such problems, and an object thereof is to provide a noise reduction apparatus, a method and a program for the same.

Solution to Problem

A noise reduction apparatus according to the present invention includes a multiresolution decomposition means that performs multiresolution decomposition on a first image inputted to obtain components having a prescribed first resolution, the first image having a prescribed resolution, the prescribed first resolution being lower than the prescribed resolution of a second image inputted, the second image being captured simultaneously with the first image, the first image and the second image being images of a same object, a low resolution component compensation means that compensates at least one decomposition component created by the decomposition with use of the second image, and an image reconfiguration means that replaces the component decomposed with a decomposition component created by the compensation, reconfigures the first image, and outputs the first image thus reconfigured.

A noise reduction method according to the present invention includes performing multiresolution decomposition on a first image inputted to obtain components having a prescribed first resolution, the first image having a prescribed resolution, the prescribed first resolution being lower than the prescribed resolution of a second image inputted, the second image being captured simultaneously with the first image, the first image and the second image being images of a same object, compensating at least one decomposition component created by the decomposition with use of the second image, and replacing the component decomposed with a decomposition component created by the compensation, reconfiguring the first image, and outputting the first image thus reconfigured.

Advantageous Effects of Invention

According to the invention, the possibility of damaging a signal component of the original image may be reduced during the noise reduction of an image created by pan-sharpen processing or the like based on a plurality of images of the same image object, which are taken simultaneously with different resolutions.

DESCRIPTION OF EMBODIMENTS

Figure 1:
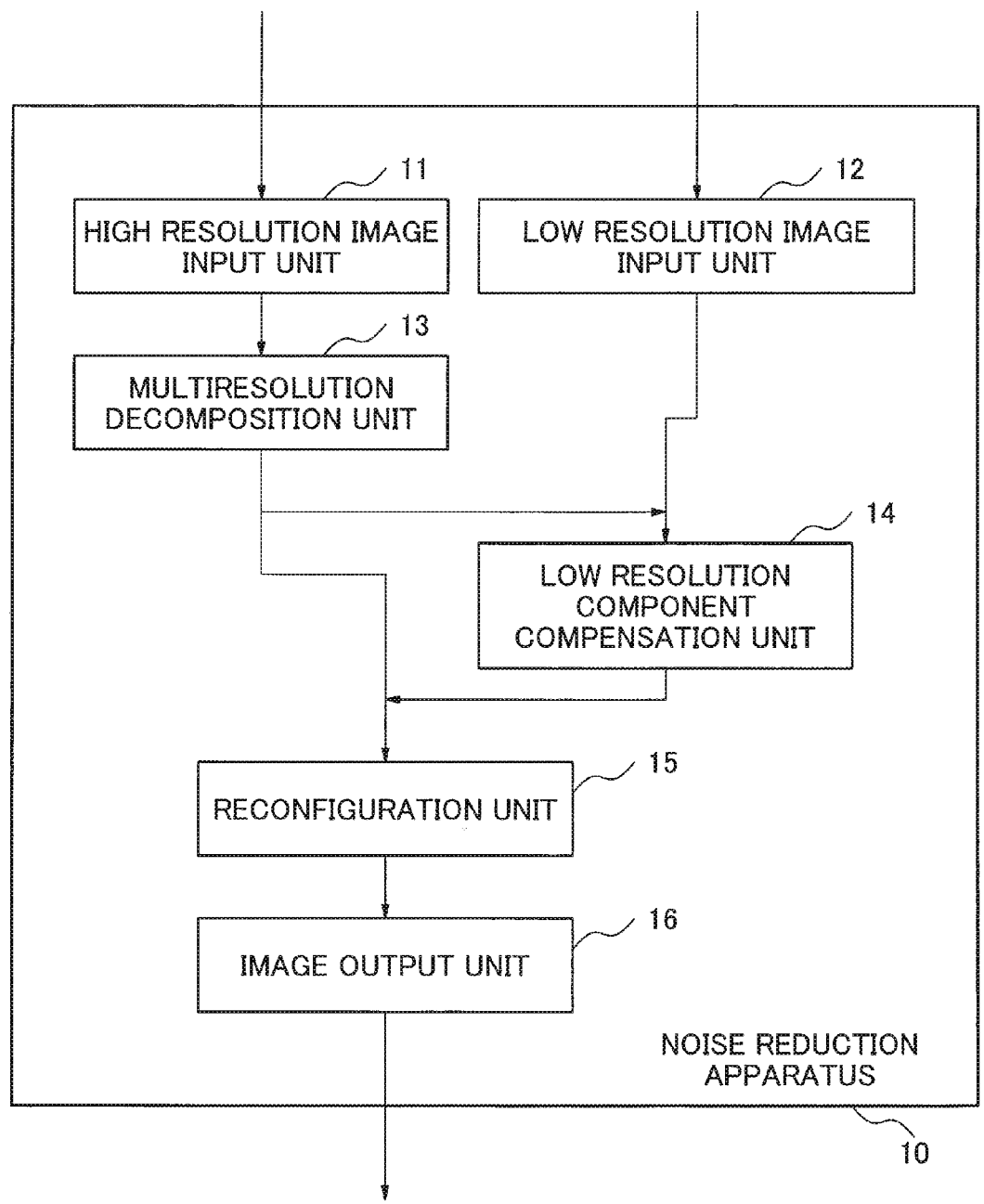
FIG. 1 is a block diagram illustrating a configuration example of a noise reduction apparatus in a first exemplary embodiment of the invention.

A first exemplary embodiment of the invention will be described referring to the drawings.

First, a configuration of a noise reduction apparatus in the exemplary embodiment will be described referring to FIG. 1.

A noise reduction apparatus 10 is provided with a high resolution image input unit 11, a low resolution image input unit 12, a multi resolution decomposition unit 13, a low resolution component compensation unit 14, a reconfiguration unit 15 and an image output unit 16.

Each of the units of the noise reduction apparatus 10 will be described.

The high resolution image input unit 11 outputs an inputted high resolution image.

The low resolution image input unit 12 outputs an inputted low resolution image.

The multi resolution decomposition unit 13 performs multiresolution decomposition of decomposing an inputted high resolution image into low resolution components.

The low resolution component compensation unit 14 compensates a low resolution component created by decomposing a high resolution image with use of an inputted low resolution image.

The reconfiguration unit 15 replaces a low resolution component, which is a target of compensation, with the compensated low resolution component, and reconfigures the high resolution image.

The image output unit 16 outputs the reconfigured high resolution image.

Next, an operation performed in the noise reduction apparatus 10 in the exemplary embodiment will be described referring to FIG. 1.

A high resolution image of an image object is inputted to the high resolution image input unit 11, and a low resolution image of the same image object as that of the high resolution image is inputted to the low resolution image input unit 12. The multiresolution decomposition unit 13 performs multiresolution decomposition of decomposing the high resolution image outputted from the high resolution image input unit 11 into low resolution components. At this time, the decomposing is performed up to a resolution equivalent to the resolution of the input low resolution image. The low resolution component compensation unit 14 compensates a low resolution component (equivalent to LL component, which will be described later) which is created by decomposing the high resolution image in the multi resolution decomposition unit 13, with use of the low resolution image outputted from the low resolution image input unit 12. The reconfiguration unit 15 replaces a low resolution component to, which is a target of compensation by the low resolution component compensation unit 14 in the multiresolution decomposition unit 13 with the low resolution component compensated in the low resolution component compensation unit 14, and reconfigures the high resolution image. The image output unit 16 outputs the high resolution image reconfigured in the reconfiguration unit 15.

Further, an operation of the exemplary embodiment will be described in detail referring to the drawings.

In the exemplary embodiment, an image is inputted from a high resolution charge coupled device (CCD) camera to the high resolution image input unit 11, and an image is inputted from a low resolution CCD camera with a resolution equal to quarter of the resolution of the high resolution CCD camera (the number of pixels per length of single side of the object is quarter) to the low resolution image input unit 12. Further, the multi resolution decomposition unit 13 performs multiresolution decomposition by Wavelet transformation.

Figure 2:
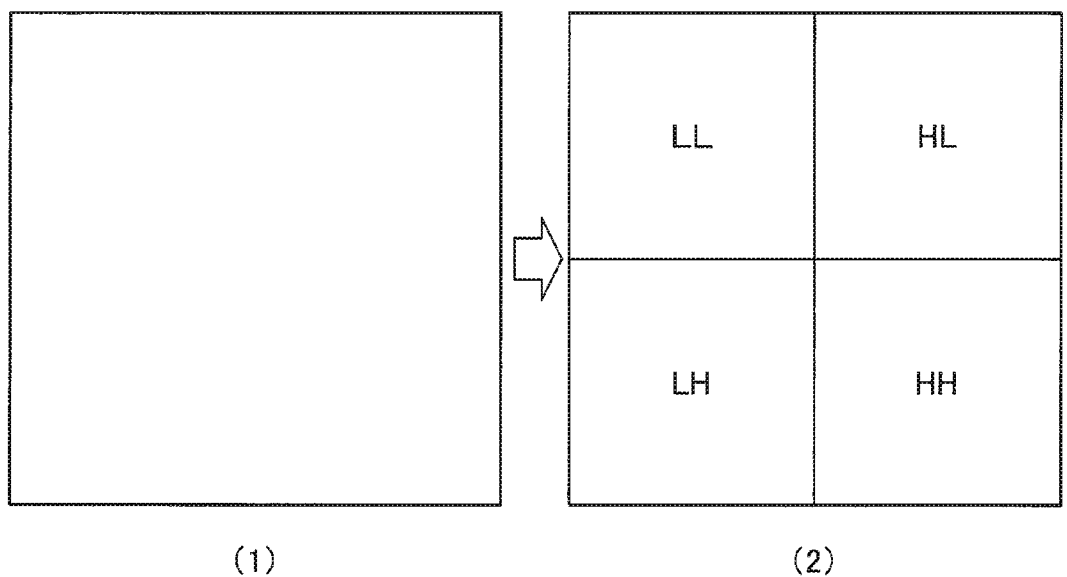
FIG. 2 is a diagram illustrating processing on an image in multiresolution decomposition.

Processing of image in multiresolution decomposition performed in the multiresolution decomposition unit 13 will be described referring to FIG. 2. In FIG. 2, (1) is an inputted high resolution image, and (2) is an image processed. The inputted high resolution image is decomposed into four components. The top left LL component is an average component over the vertical and horizontal directions. The top right HL component is a difference from an average over the vertical direction. The bottom left LH component is a difference from an average over the horizontal direction. The bottom right HH component is a difference from the average component over the vertical and horizontal directions. The average component is expressed by scaling factor. The difference from the average is expressed by wavelet factor. It should be noted that, in (1) and (2), the size of one pixel is the same, and the length of single side of each component in (2) is half of the length of single side of the inputted high resolution image.

Figure 3:
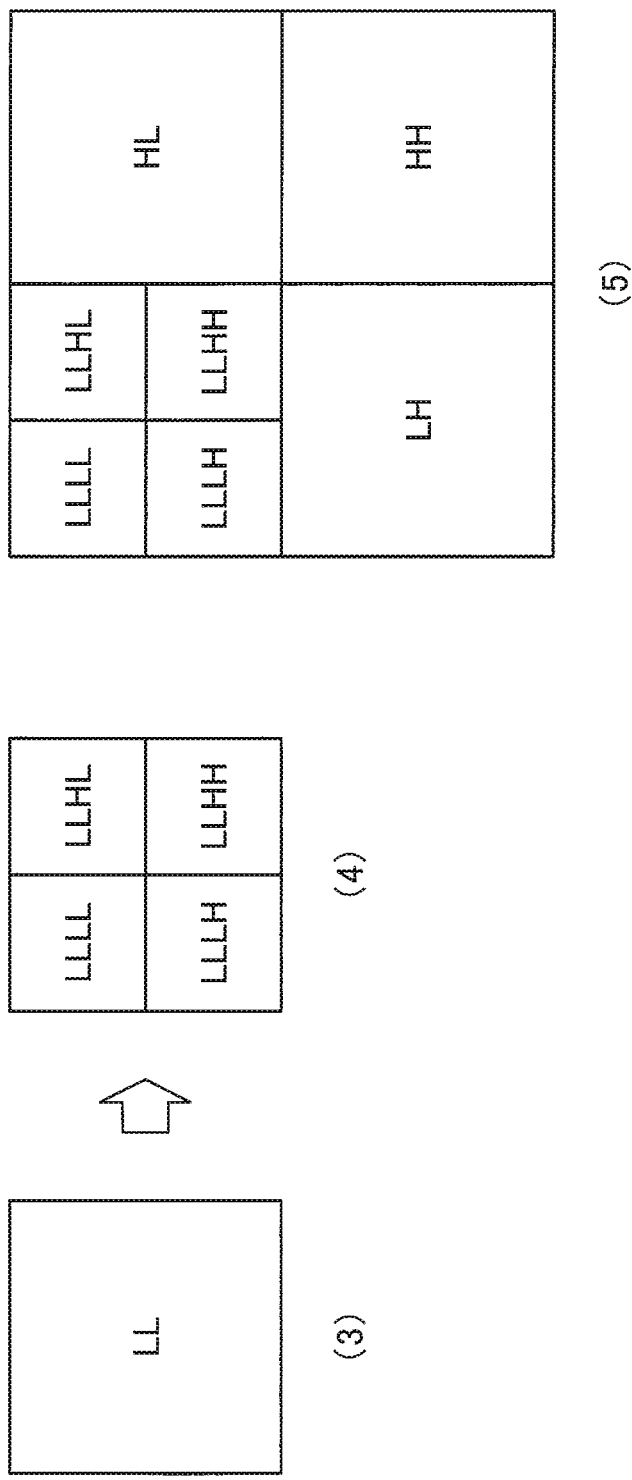
FIG. 3 is a diagram illustrating processing on an image in multiresolution decomposition.

Next processing of the multiresolution decomposition will be described referring to FIG. 3. In FIG. 3, (3) is the LL component in the previous processing, and (4) is an image decomposed into four components by processing. The top left LLLL component is an average component over the vertical and horizontal directions, the top right LLHL component is a difference from an average over the vertical direction, the bottom left LLLH component is a difference from an average over the horizontal direction, and the bottom right HHHH component is a difference from the average component over the vertical and horizontal directions. When the result of the present processing is combined with the result of the previous processing, (5) is obtained. It should be noted that, in (3), (4) and (5), the size of one pixel is the same, and the length of single side of each component in (4) is quarter of the length of single side of the inputted high resolution image.

Figure 4:
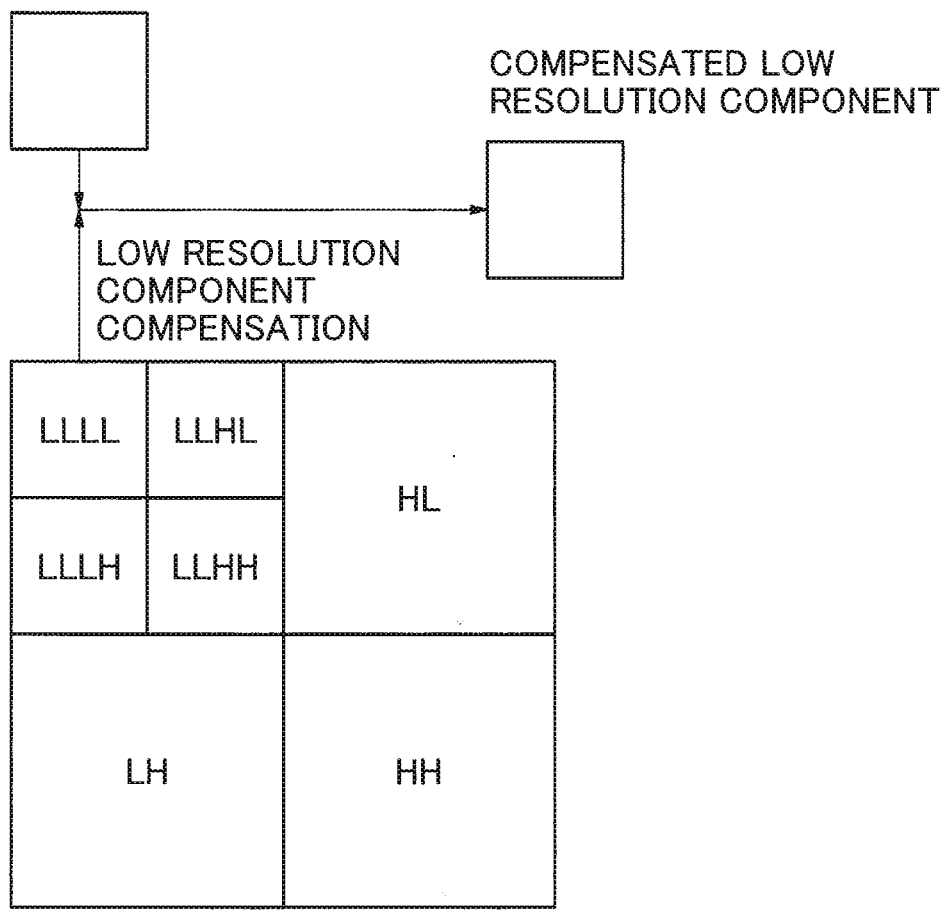
FIG. 4 is a diagram illustrating processing on a low resolution component in compensation.

Compensation performed in the low resolution component compensation unit 14 will be described referring to FIG. 4. The low resolution component compensation unit 14 compensates a low resolution component (LLLL component whose resolution is the same as the resolution of the low resolution image) which is created by decomposing a high resolution image in the multiresolution decomposition unit 13. In the compensation of the low resolution component, a compensated low resolution component is an average of the low resolution component and the low resolution image. As noise is generated at random by nature, there is no correlation between noise included in the low resolution component and noise included in the low resolution image. Therefore, by averaging corresponding pixels of the low resolution component and the low resolution image, noise components are reduced. On the other hand, since signals of the original image are similarly included in both the low resolution component and the low resolution image, the original signals are not reduced even by averaging. In this way, this compensation allows to reduce only noise components. It should be noted that, in this compensation, processing of alignment between the low resolution image and the high resolution image is performed.

Figure 5:
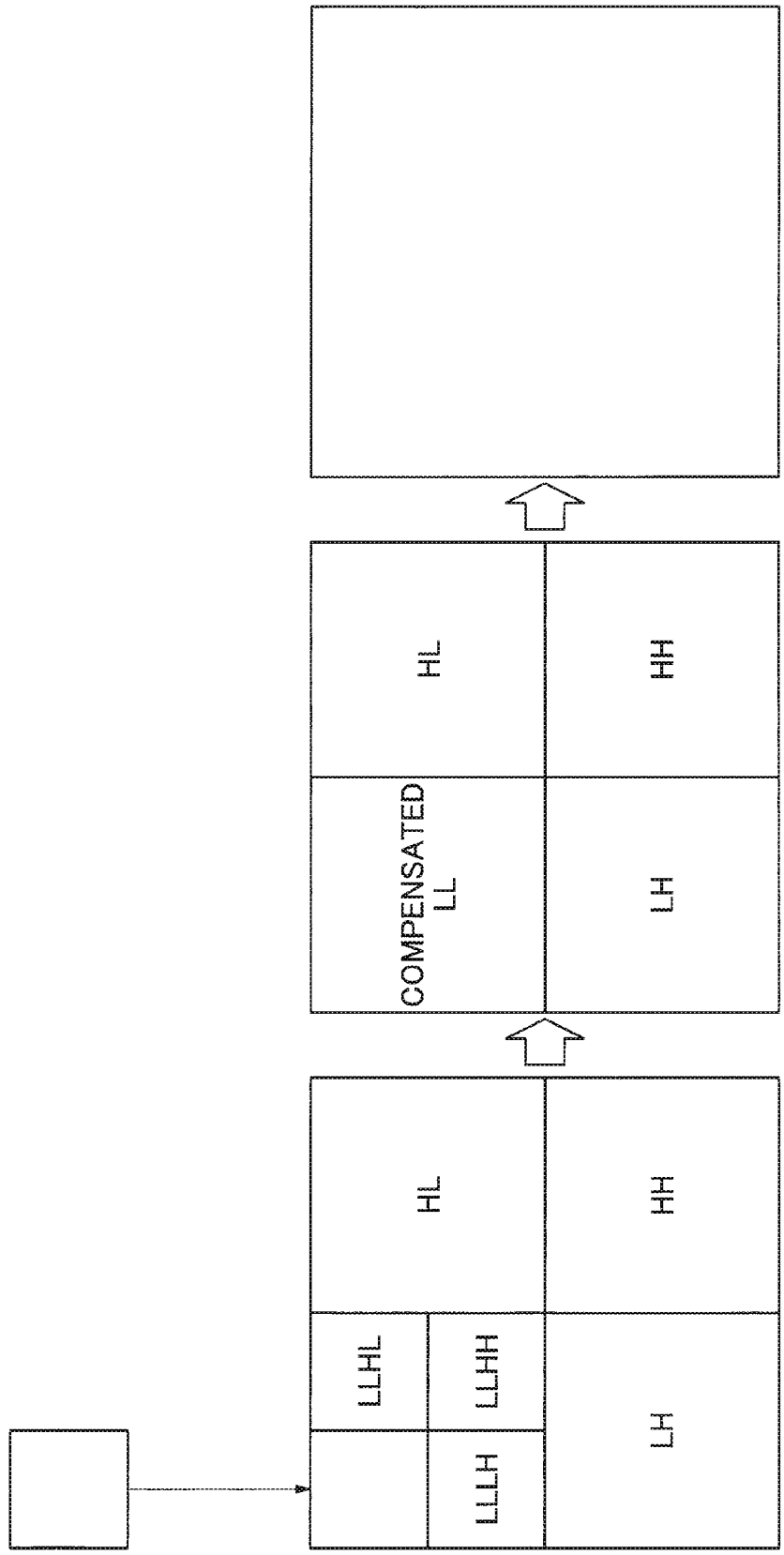
FIG. 5 is a diagram illustrating processing on an image in reconfiguration.

Reconfiguration performed in the reconfiguration unit 15 will be described referring to FIG. 5. The reconfiguration unit 15 performs reverse processing to the multiresolution decomposition based on the low resolution component which is created by decomposing and compensating the high resolution image. The reconfiguration unit 15 then reconfigures the high resolution image. The reconfigured high resolution image is an image with reduced noise as compared with the inputted high resolution image. It should be noted that, in the above-described compensation, since the processing of alignment between the low resolution image and the high resolution image is performed. the reconfiguration of high resolution image is performed appropriately.

It should be noted that the resolution of the low resolution image is quarter of the resolution of the high resolution image, but the resolution ratio is not limited to the quarter if it is less than the resolution of the high resolution image. When the multiresolution decomposition method is Wavelet transformation, the resolution becomes the half by single decomposition. Therefore, it is desirable to set the resolution ratio at the reciprocal of a power of 2. The multiresolution decomposition method may be other than Wavelet transformation, and the resolution ratio may be the reciprocal of a natural number if possible in the other method. Also, images may be interpolated as necessary.

Further, the high resolution CCD camera may be replaced with a panchromatic sensor, and the low resolution CCD camera may be replaced with a multispectral sensor. In that case, an image obtained by averaging images in a plurality of wavelength bands of the multispectral sensor may be used as the low resolution image. The multispectral sensor is configured to capture an image in each of a plurality of wavelength ranges. For instance, if the multispectral sensor is composed with four wavelength bands, i.e., blue, green, red and near-infrared bands, and the panchromatic sensor captures an image in a wavelength range of visible light region of from blue light to red light, an image obtained by averaging images in three wavelength bands of blue, green and red bands of the multispectral sensor may be used as the low resolution image. In that case, as the wavelengths used in the high resolution image and the wavelengths used in the low resolution image are close to each other, there is an advantage that a difference between the high resolution image and the low resolution image is reduced. Furthermore, regardless of wavelength range in the panchromatic sensor, an image obtained by averaging images in all the wavelength bands of the multispectral sensor may be used as the low resolution image. In that case, statistically, random noise can be further reduced as the number of images to be used in the averaging increases. Therefore, there is an advantage that effect of noise reduction is improved. Furthermore, an image with best signal-to-noise ratio (SN) characteristics among a plurality of images of the multispectral sensor may be used as the low resolution image. Alternatively, an image obtained by averaging a plurality of images according to SN characteristics may be used as the low resolution image. If there occurs positional displacement between images of the multispectral sensor and a large number of images are averaged, edges, outlines or the like may be blurred. Therefore, an image obtained by averaging some selected images with good SN characteristics may be used as the low resolution image, thereby balancing the effect of noise reduction and the possibility that edges, outlines or the like be blurred.

With regard to compensation of the low resolution component, an image obtained by averaging the low resolution component and the low resolution image is used as the compensated low resolution component. Alternatively, the averaging may be weighted-averaging and the like. When the SN characteristics of the low resolution image are remarkably better than the SN characteristics of the high resolution image, the low resolution image itself may be used as a compensated low resolution component with less noise. It should be noted that the compensation method is not limited to the above-described methods and may be any compensation method as long as it uses differences of noise between the low resolution image and the high resolution image.

As described above, the possibility of damaging a signal component of the original image may be reduced during the noise reduction of an image created by pan-sharpen processing or the like based on a plurality of images of the same image object, which are taken simultaneously with different resolutions.

Subsequently, a second exemplary embodiment of the invention will be described referring to the drawings.

Figure 6:
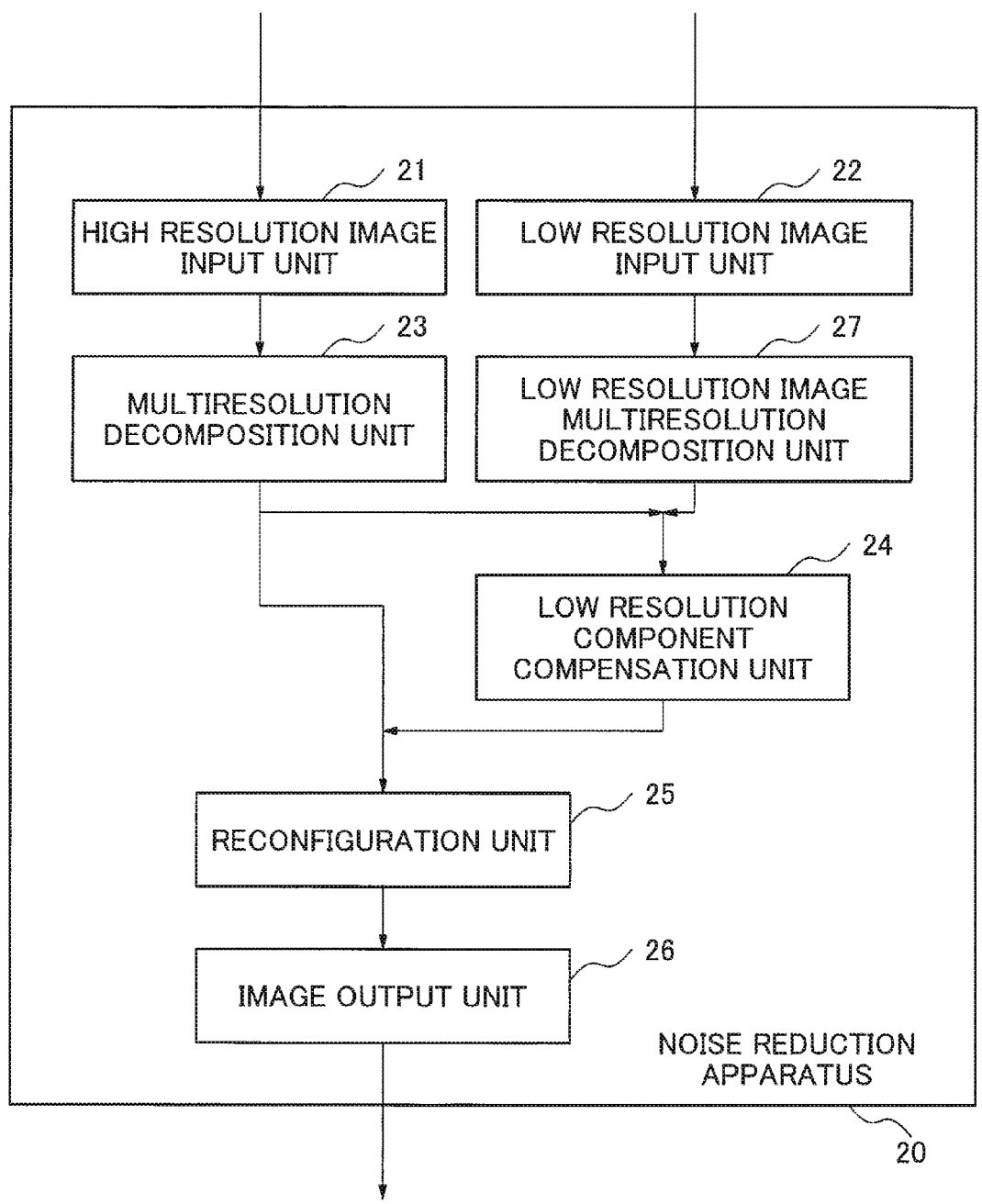
FIG. 6 is a block diagram illustrating a configuration example of a noise reduction apparatus in a second exemplary embodiment of the invention.

Referring to FIG. 6, the second exemplary embodiment is different from the first exemplary embodiment in further including a low resolution image multiresolution decomposition unit 27 and in the operations of the multiresolution decomposition unit and the low resolution component compensation unit. Here, the second exemplary embodiment will be described mainly on the different portions.

The low resolution image multiresolution decomposition unit 27 performs multiresolution decomposition of decomposing an inputted low resolution image into low resolution components.

A multiresolution decomposition unit 23 performs multiresolution decomposition of decomposing an inputted high resolution image to a resolution of the low resolution component created by decomposing the low resolution image.

A low resolution component compensation unit 24 compensates the low resolution component created by decomposing the high resolution image, with use of the low resolution component created by decomposing the low resolution image.

Further, an operation of the second exemplary embodiment will be described in detail referring to the drawings.

Figure 7:
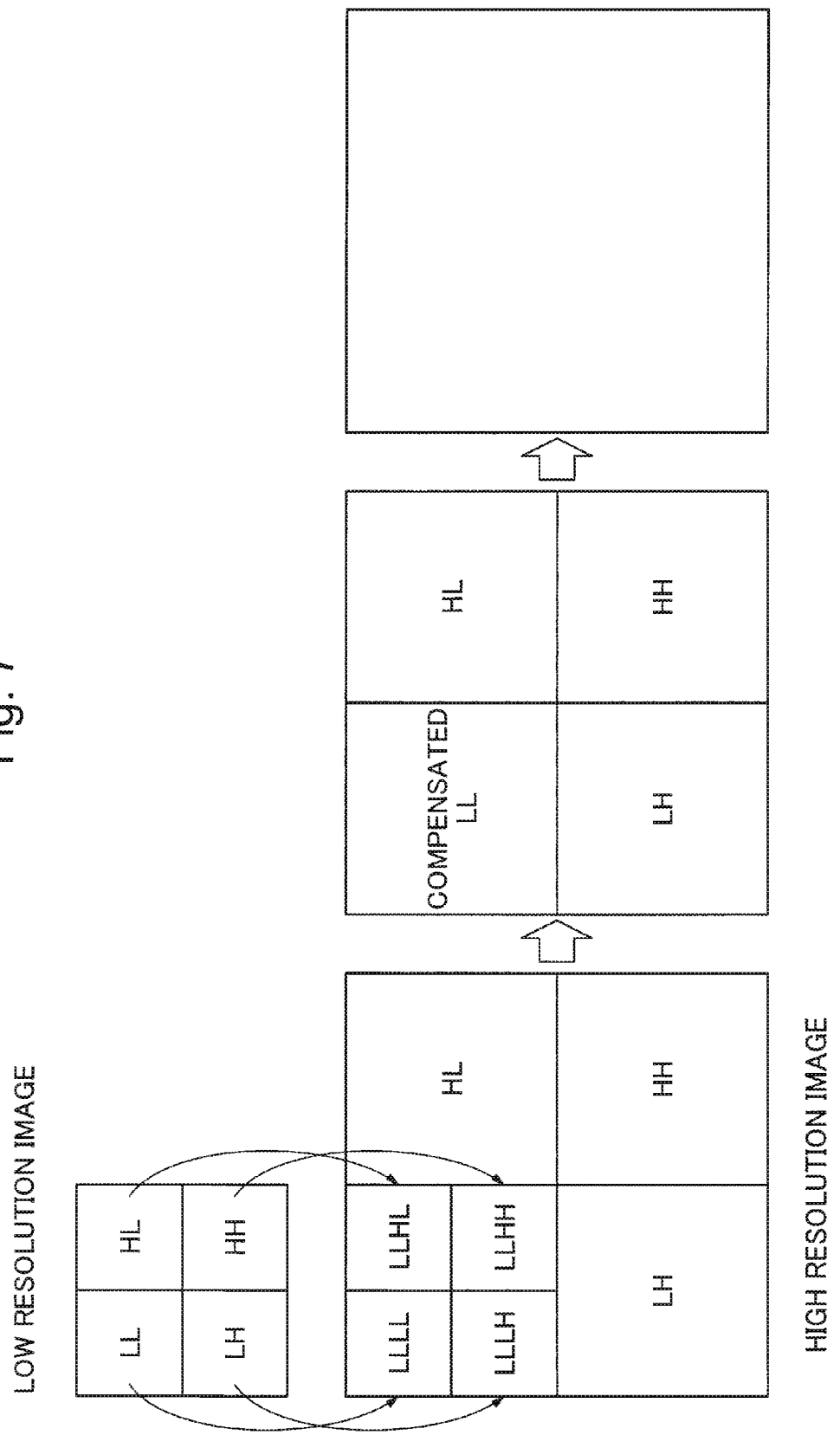
FIG. 7 is a diagram illustrating processing on a decomposition component in compensation.

Compensation performed in the low resolution component compensation unit 24 will be described referring to FIG. 7. The resolution of the low resolution image is half of the resolution of the high resolution image, and the multiresolution decomposition is performed until the resolution of the low resolution image and the high resolution image each become half of the resolution of the low resolution image. The low resolution image is decomposed into an LL component, an HL component, an LH component and an HH component. The LL component created by decomposing the high resolution image is decomposed into an LLLL component, an LLHL component, an LLLH component and an LLHH component. The low resolution component compensation unit 24 compensates the LLLL component, the LLHL component, the LLLH component and the LLHH component of the high resolution image with the LL component, the HL component, the LH component and the HH component of the low resolution image, respectively. With regard to the compensation, components obtained by averaging decomposition components of the high resolution image and decomposition components of the low resolution image, respectively are used as compensated decomposition components.

It should be noted that the resolution of the low resolution image is half of the resolution of the high resolution image, but the resolution ratio is not limited to the half if it is less than the resolution of the high resolution image. When the multiresolution decomposition method is Wavelet transformation, the resolution becomes the half by single decomposition. Therefore, it is desirable to set the resolution ratio at the reciprocal of a power of 2. The multiresolution decomposition method may be other than Wavelet transformation, and the resolution ratio may be the reciprocal of a natural number if possible in the other method. Also, images may be interpolated as necessary.

Further, a high resolution CCD camera and a low resolution CCD camera, a panchromatic sensor and a multispectral sensor, or the likes may be used for inputting of the images. If a multi spectral sensor is used, an image obtained by averaging images in a plurality of wavelength bands of the multispectral sensor may be used as the low resolution image. Furthermore, an image with best SN characteristics among a plurality of images of the multispectral sensor may be used as the low resolution image, or an image obtained by averaging a plurality of images according to SN characteristics may be used as the low resolution image.

With regard to compensation of the decomposition component, components obtained by averaging decomposition components of each of the high resolution image and the low resolution image are used as the compensated decomposition components. Alternatively, the averaging may be weighted-averaging and the like. Furthermore, a decomposition component of the high resolution image or the low resolution image may be used as the compensated decomposition component.

The decomposition component compensation method may be altered for each of decomposition components having different L or H. For instance, if it is known that noise in certain frequencies is included only in the high resolution image because noise can be easily on a high resolution image, a decomposition component of the low resolution image for a decomposition component corresponding to the frequencies may be used as the compensated decomposition component. Furthermore, decomposition components of the high resolution image and the low resolution image may be respectively compensated by assigning different weights for each decomposition component depending on the frequency characteristics of the high resolution image and the low resolution image and by taking weighted-average thereof. This enables to improve the effect of noise reduction. It should be noted that the compensation method is not limited to the above-described methods, and may be any method as long as it uses differences of noise between the low resolution image and the high resolution image.

Such multiresolution decomposition and compensation may be further performed on a decomposition component corresponding to the LL component.

As described above, the possibility of damaging a signal component of the original image may be reduced during the noise reduction of an image created by pan-sharpen processing or the like based on a plurality of images of the same image object, which are taken simultaneously with different resolutions.

Next, a third exemplary embodiment of the invention will be described referring to the drawings.

Figure 8:
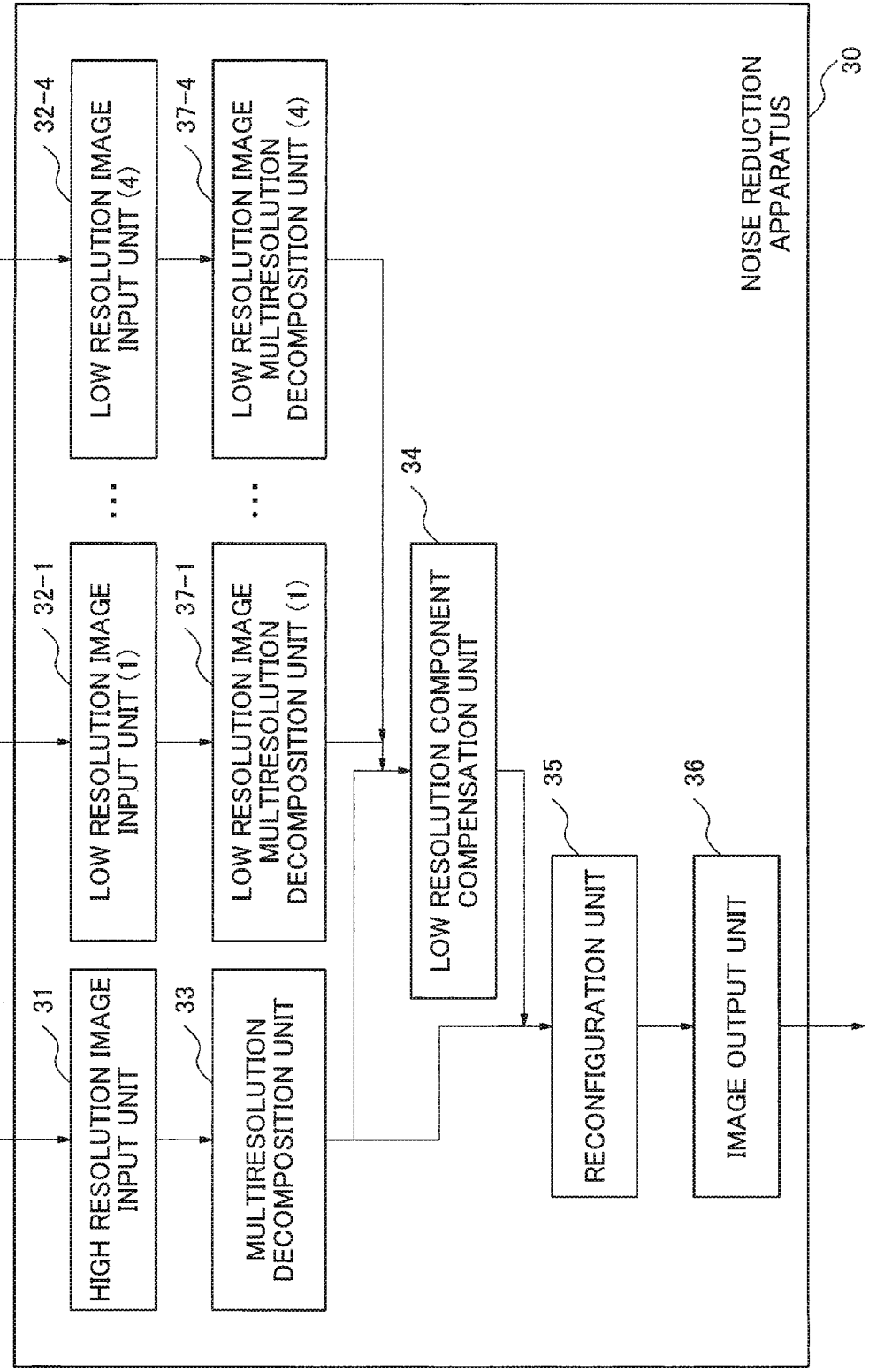
FIG. 8 is a block diagram illustrating a configuration example of a noise reduction apparatus in a third exemplary embodiment of the invention.

Referring to FIG. 8, the third exemplary embodiment is different from the second exemplary embodiment in including a plurality of low resolution image input units 32 and a plurality of low resolution image multiresolution decomposition units 37, and in the operation of the low resolution component compensation unit. Here, the exemplary embodiment will be described mainly on the different portions.

The low resolution image input units 32 respectively output an inputted low resolution image.

The low resolution image multiresolution decomposition units 37 respectively perform multiresolution decomposition of dividing an inputted low resolution image into low resolution components.

A low resolution component compensation unit 34 compensates a low resolution component created by decomposing a high resolution image, with use of the low resolution components respectively created by decomposing the plurality of low resolution images.

Further, an operation of the third exemplary embodiment will be described in detail.

An image is inputted, for example, from a high resolution panchromatic sensor to a high resolution image input unit 31, and images are inputted, for example, from multispectral sensors of blue, green, red and near-infrared wavelength bands to the low resolution image input units 32-1 to 32-4, respectively. The low resolution image multiresolution decomposition units 37-1 to 37-4 respectively perform multiresolution decomposition on inputted low resolution images 1 to 4 in the respective wavelength bands up to a prescribed resolution (half of the resolution of the low resolution image, for example). A multiresolution decomposition unit 33 performs multiresolution decomposition on the inputted high resolution image up to the same prescribed resolution as the low resolution images. The low resolution component compensation unit 33 sets a component obtained by averaging decomposition components of the high resolution image and decomposition components of the low resolution images 1 to 4, respectively, as a compensated decomposition component. Here, the averaging is weighted-averaging, for instance. The weighting is performed according to the resolutions and characteristics of the wavelength bands. Light in a short wavelength band such as a blue wavelength band is scattered greatly in the atmosphere. Therefore, the noise is likely to increase in a high frequency range as compared with a long wavelength band such as a red wavelength band or a near-infrared wavelength band. Therefore, the weighting may be performed in such a manner that the weight on the longer wavelength band becomes larger as the resolution of component becomes higher.

By compensating the decomposition component of the high resolution image with the decomposition components created by decomposing the plurality of low resolution images, the compensation can be performed while taking account of characteristics of the plurality of low resolution images such as the resolutions and the observation wavelengths. This enables to improve the effect of noise reduction.

It should be noted that the numbers of the low resolution image input units and the low resolution image multiresolution decomposition units are both four, but is not limited thereto.

As described above, the possibility of damaging a signal component of the original image may be reduced during the noise reduction of an image created by pan-sharpen processing or the like based on a plurality of images of the same image object, which are taken simultaneously with different resolutions.

Next, a fourth exemplary embodiment of the invention will be described referring to the drawings.

First, a configuration of the fourth exemplary embodiment will be described referring to FIG. 9.

Figure 9:
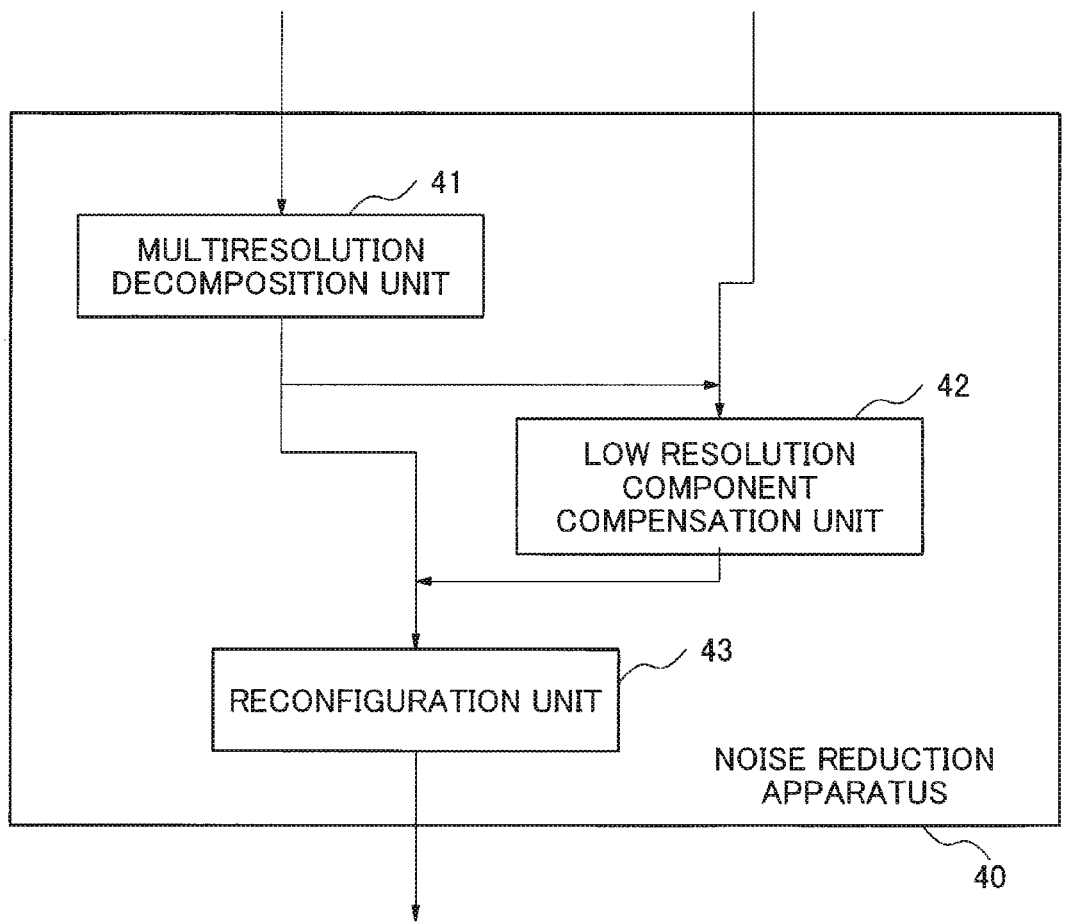
FIG. 9 is a block diagram illustrating a configuration example of a noise reduction apparatus in a fourth exemplary embodiment of the invention.

FIG. 9 illustrates a configuration example of a noise reduction apparatus in the fourth exemplary embodiment. A noise reduction apparatus 40 is provided with a multiresolution decomposition unit 41, a low resolution component compensation unit 42 and a reconfiguration unit 43.

Next, an operation performed in the noise reduction apparatus 40 in the fourth exemplary embodiment will be described referring to FIG. 9.

A first image with a prescribed first resolution is inputted to the multiresolution decomposition unit 41. A second image of the same object, captured simultaneously with the first image, with a prescribed second resolution that is lower than the first resolution is inputted to the low resolution component compensation unit 42. The multiresolution decomposition unit 41 decomposes the first image into components with the second resolution. The low resolution component compensation unit 42 compensates at least one low resolution component created by decomposition with use of the second image. The reconfiguration unit 43 replaces a low resolution component with the low resolution component created by the compensation, reconfigures the first image, and outputs the first image thus reconfigured.

As described above, the possibility of damaging a signal component of the original image may be reduced during the noise reduction of an image created by pan-sharpen processing or the like based on a plurality of images of the same image object, which are taken simultaneously with different resolutions.

The whole or part of the exemplary embodiments disclosed above can be described as, but not limited to, the following supplementary notes.

(Supplementary note 1) A noise reduction apparatus including: a multiresolution decomposition means that performs multiresolution decomposition on a first image inputted to obtain components having a prescribed first resolution, the first image having a prescribed resolution, the prescribed first resolution being lower than the prescribed resolution of a second image inputted, the second image being captured simultaneously with the first image, the first image and the second image being images of a same object; a low resolution component compensation means that compensates at least one decomposition component created by the decomposition with use of the second image; and an image reconfiguration means that replaces the component decomposed with a decomposition component created by the compensation, reconfigures the first image, and outputs the first image thus reconfigured.

(Supplementary note 2) The noise reduction apparatus according to supplementary note 1, further including: a low resolution image multiresolution decomposition means that performs multiresolution decomposition on the second image to obtain components with a prescribed second resolution that is lower than the first resolution, wherein the multiresolution decomposition means performs the multiresolution decomposition on the first image to obtain components having the second resolution, and wherein the low resolution component compensation means compensates at least one decomposition component created by the decomposition of the first image to the second resolution with use of a corresponding decomposition component created by the decomposition of the second image.

(Supplementary note 3) The noise reduction apparatus according to supplementary note 1 or supplementary note 2, wherein a method of the compensation includes weighted-averaging of the decomposition component of the first image and the second image or weighted-averaging of the decomposition component of the first image and the decomposition component of the second image.

(Supplementary note 4) The noise reduction apparatus according to any one of supplementary notes 1 to 3, wherein the second image includes a plurality of images having different characteristics.

(Supplementary note 5) The noise reduction apparatus according to any one of supplementary notes 1 to 4, wherein the first image is a panchromatic image, and the second image is a multispectral image.

(Supplementary note 6) A noise reduction method including: performing multiresolution decomposition on a first image inputted to obtain components having a prescribed first resolution, the first image having a prescribed resolution, the prescribed first resolution being lower than the prescribed resolution of a second image inputted, the second image being captured simultaneously with the first image, the first image and the second image being images of a same object; compensating at least one decomposition component created by the decomposition with use of the second image; and replacing the component decomposed with a decomposition component created by the compensation, reconfiguring the first image, and outputting the first image thus reconfigured.

(Supplementary note 7) The noise reduction method according to supplementary note 6, further including: performing additional multiresolution decomposition on the second image to obtain components with a prescribed second resolution that is lower than the first resolution, wherein during the performing multiresolution decomposition, the first image is subject to the multiresolution decomposition to obtain components having the second resolution, and wherein during the compensating at least one decomposition component created by the decomposition with use of the second image, at least one decomposition component created by the decomposition of the first image to the second resolution is compensated with use of a corresponding decomposition component created by the decomposition of the second image.

(Supplementary note 8) The noise reduction method according to supplementary note 6 or supplementary note 7, wherein a method of the compensation includes weighted-averaging of the decomposition component of the first image and the second image or weighted-averaging of the decomposition component of the first image and the decomposition component of the second image.

(Supplementary note 9) The noise reduction method according to any one of supplementary notes 6 to 8, wherein the second image includes a plurality of images having different characteristics.

(Supplementary note 10) A recording medium storing a noise reduction program that causes a computer including a noise reduction apparatus to execute: a multiresolution decomposition process that performs multiresolution decomposition on a first image inputted to obtain components having a prescribed first resolution, the first image having a prescribed resolution, the prescribed first resolution being lower than the prescribed resolution of a second image inputted, the second image being captured simultaneously with the first image, the first image and the second image being images of a same object; a low resolution component compensation process that compensates at least one decomposition component created by the decomposition with use of the second image; and an image reconfiguration process that replaces the component decomposed with a decomposition component created by the compensation, reconfigures the first image, and outputs the first image thus reconfigured.

(Supplementary note 11) The noise reduction apparatus according to supplementary note 10, further including: a low resolution image multiresolution decomposition process that performs multiresolution decomposition on the second image to obtain components with a prescribed second resolution that is lower than the first resolution, wherein the multiresolution decomposition process performs the multiresolution decomposition on the first image to obtain components having the second resolution, and wherein the low resolution component compensation process compensates at least one decomposition component created by the decomposition of the first image to the second resolution with use of a corresponding decomposition component created by the decomposition of the second image.

(Supplementary note 12) The noise reduction apparatus according to supplementary note 10 or supplementary note 11, wherein a method of the compensation includes weighted-averaging of the decomposition component of the first image and the second image or weighted-averaging of the decomposition component of the first image and the decomposition component of the second image.

(Supplementary note 13) The noise reduction apparatus according to any one of supplementary notes 10 to 12, wherein the second image includes a plurality of images having different characteristics.

While the invention has been particularly shown and described with reference to exemplary embodiments thereof, the invention is not limited to those embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2013-189549, filed on Sep. 12, 2013, the disclosure of which is incorporated herein in its entirety by reference.

INDUSTRIAL APPLICABILITY

The invention is available for a noise reduction apparatus, a method and a program for the same.

REFERENCE SIGNS LIST

10, 20, 30, 40 Noise reduction apparatus
11, 21, 31 High resolution image input unit
12, 22, 32-1 to 32-4 Low resolution image input unit
13, 23, 33, 41 Multiresolution decomposition unit
14, 24, 34, 42 Low resolution component compensation unit
15, 25, 35, 43 Reconfiguration unit
16, 26, 36 Image output unit
27, 37-1 to 37-4 Low resolution image multiresolution decomposition unit

What is claimed is:

1. A noise reduction method comprising:
   performing multiresolution decomposition on a first image inputted to obtain components having a prescribed first resolution, the first image having a prescribed resolution, the prescribed first resolution being lower than the prescribed resolution of a second image inputted, the second image being captured simultaneously with the first image, the first image and the second image being images of a same object;
   compensating at least one decomposition component created by the decomposition with use of the second image; and
   replacing the component decomposed with a decomposition component created by the compensation, reconfiguring the first image, and outputting the first image thus reconfigured.

2. The noise reduction method according to claim 1, further comprising:
   performing additional multiresolution decomposition on the second image to obtain components with a prescribed second resolution that is lower than the first resolution,
   wherein during the performing multiresolution decomposition, the first image is subject to the multiresolution decomposition to obtain components having the second resolution, and
   wherein during the compensating at least one decomposition component created by the decomposition with use of the second image, at least one decomposition component created by the decomposition of the first image to the second resolution is compensated with use of a corresponding decomposition component created by the decomposition of the second image.

3. The noise reduction method according to claim 1, wherein a method of the compensation includes weighted-averaging of the decomposition component of the first image and the second image or weighted-averaging of the decomposition component of the first image and the decomposition component of the second image.

4. The noise reduction method according claim 1, wherein the second image includes a plurality of images having different characteristics.

5. A non-transitory recording medium storing a noise reduction program that causes a computer comprising a noise reduction apparatus to execute:
   a multiresolution decomposition process that performs multiresolution decomposition on a first image inputted to obtain components having a prescribed first resolution, the first image having a prescribed resolution, the prescribed first resolution being lower than the prescribed resolution of a second image inputted, the second image being captured simultaneously with the first image, the first image and the second image being images of a same object;

a low resolution component compensation process that compensates at least one decomposition component created by the decomposition with use of the second image; and an image reconfiguration process that replaces the component decomposed with a decomposition component created by the compensation, reconfigures the first image, and outputs the first image thus reconfigured.

* * * * *